(12) United States Patent
Ono et al.

(10) Patent No.: US 6,553,164 B1
(45) Date of Patent: Apr. 22, 2003

(54) Y-BRANCH WAVEGUIDE

(75) Inventors: Hideki Ono, Tokyo (JP); Hideaki Okayama, Tokyo (JP)

(73) Assignee: Oki Electric Industry, Co., Ltd., Tokyo (JP)

( * ) Notice: Subject to any disclaimer, the term of this patent is extended or adjusted under 35 U.S.C. 154(b) by 0 days.

(21) Appl. No.: 09/697,135

(22) Filed: Oct. 27, 2000

(30) Foreign Application Priority Data

Oct. 28, 1999 (JP) ............................................. 11-307537

(51) Int. Cl.[7] ............................... G02B 6/26; G02B 6/42
(52) U.S. Cl. ............................... 385/45; 385/42; 385/50
(58) Field of Search ................................ 385/39, 42–52

(56) References Cited

U.S. PATENT DOCUMENTS

| 5,586,209 | A | * | 12/1996 | Matsuura et al. | 385/45 |
| 5,627,928 | A | * | 5/1997 | Matsuura et al. | 385/45 |
| 5,706,377 | A | * | 1/1998 | Li | 385/37 |
| 5,745,619 | A | * | 4/1998 | Li et al. | 385/48 |
| 5,757,990 | A | * | 5/1998 | Miyakawa | 385/16 |
| 5,757,995 | A | * | 5/1998 | Chen et al. | 385/45 |
| 6,236,784 | B1 | * | 5/2001 | Ido | 385/45 |

FOREIGN PATENT DOCUMENTS

| JP | 3-172804 | 7/1991 | G02B/6/12 |
| JP | 3-245107 | 10/1991 | G02B/6/12 |
| JP | 5-11130 | 1/1993 | G02B/6/12 |
| JP | 5-119220 | 5/1993 | G02B/6/12 |

* cited by examiner

*Primary Examiner*—Brian Healy
*Assistant Examiner*—Kevin S Wood
(74) *Attorney, Agent, or Firm*—Wenderoth, Lind & Ponack, L.L.P.

(57) ABSTRACT

A Y-branch waveguide includes a single merging side waveguide, two branching waveguides, and a junction area waveguide provided between the merging side waveguide and the branching waveguides and formed in a tapered shape being thicker at the branching than at the merging side. The junction area waveguide and the branching waveguides are connected by two straight waveguides parallel to each other. The straight waveguides extend in the same direction as the direction of propagation of light inside the junction area waveguide, when light is injected from the merging side waveguide.

1 Claim, 8 Drawing Sheets

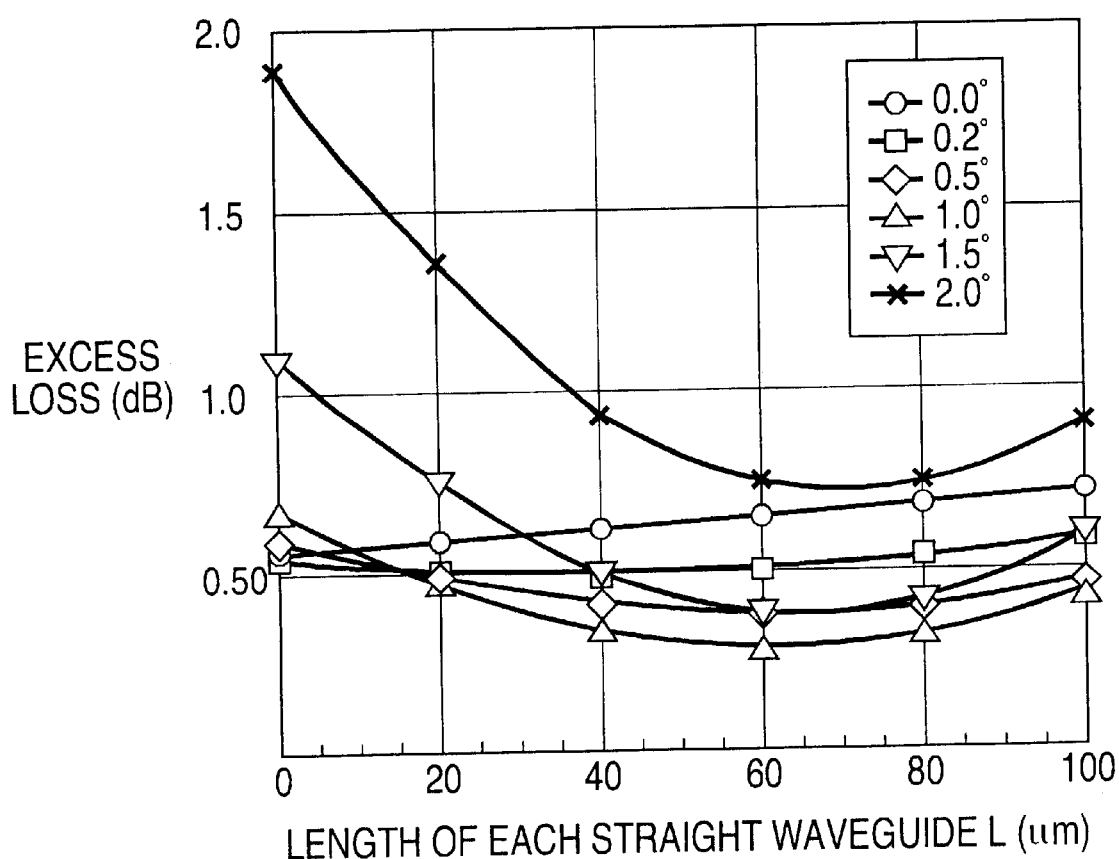

Y-BRANCH WAVEGUIDE

BACKGROUND OF THE INVENTION

1. Field of the Invention

The present invention relates to a Y-branch waveguide.

2. Description of the Related Art

Conventionally, a Y-branch waveguide has been used as a waveguide type element for recombining or branching light. A Y-branch waveguide is a basic element making up various waveguide devices, and is an essential element in the construction of optical network systems.

As an element having the function of causing branching of light, besides the Y-branch waveguide there is a directional coupler, such as that disclosed in Japanese Patent Laid-open No. Hei.3-172804 or Japanese Patent Laid-open No. Hei.5-119220. However, the propagation constant of a directional coupler varies considerably with the wavelength of an incoming beam, which means that the branching ratio depends of the wavelength and varies a lot. Accordingly, with a directional coupler the practicable wavelength band is limited to 5–10 nm. Also, in the case of a directional coupler, it is extremely difficult to make an interval between waveguides or a coupling length the size it was designed at, which means that there are very large variations in characteristics between products.

On the other hand, it is well known that the branching ration of Y-branch waveguide type elements is less wavelength dependent, which means that there is a practicable wavelength band of about 100 nm, for example, and also there is reduced variation in characteristics caused by dimensional errors in the manufacturing process such as with a direction coupler. For the above described reasons, current Y-branch waveguide are in general use.

A conventional Y-branch waveguide will now be described below with reference to FIG. 7. FIG. 7(A) is a drawing schematically showing the structure of a conventional waveguide.

As shown in FIG. 7, this Y-branch waveguide 101 comprises a single combining side waveguide 103, two branching waveguides 105a and 105b, and a junction area waveguide 107. The junction area waveguide 107 connects between the combining side waveguide 103 and each of the branching waveguides 105a and 105b. The junction area waveguide 107 is has a tapered shape where the width at the branching is wider than the width at the combining side.

The waveguide 101 shown in FIG. 7(A) takes incoming light from the combining side waveguide 104, and outputs light to the two branching waveguides 105a and 105b as two beams of branched light having power distributed at a specified ratio. This branching ratio can be set as desired, and is typically equally distributed.

As is also well known, in order to reduce light loss, theoretically a branching width H of a section sandwiched between the branching waveguides 105a and 105b connected to the junction area waveguide 107 is preferably zero.

However, as shown in FIG. 7, with the conventional Y-branch waveguide 101, it is well known that a rounded portion 109 is formed in part of the junction area waveguide 107 sandwiched between the two branching waveguides 103a and 103b. The rounded portion 109 has a portion that is to be cut out into a V-shaped slot that is originally U-shaped due to limitations of ultrafine machining techniques used in the manufacturing process, namely the limits of patterning and etching machining precision, which means that some of the waveguide material remains in the region that is cut out.

FIG. 7(B) is an enlarged view of part of FIG. 7(A), and shows the vicinity of where the branching waveguides 105a and 105b and the transition side waveguide 107 are connected.

As shown in FIG. 7(B), theoretically the branch width H is preferably zero, so the Y-branch waveguide is designed as a structure having a V-shaped valley section 109a as shown by the dotted line (in this case, the branch width =0), but as shown by the solid line, in actual fact a rounded portion 109 (that is, remaining parts of the wave guide material) occurs.

If a rounded portion occurs in this manner, the branch width H of the branching waveguides 105a and 105b becomes wider than the designed value, causing the effective length of the junction area waveguide 107 to also be longer than the designed value.

The length of the junction area waveguide 107 has essential parameters that determine the characteristics of the Y-branch waveguide, as disclosed I reference I (Japanese patent Laid-open No. Hei.5-11130). Accordingly, if the effective length of the junction area waveguide 107 varies, it is not possible to obtain the characteristics that were designed for.

One proposition to deal with this type of problem is, as disclosed in reference II (Japanese Patent Laid-open No. Hei. 3-2451070), a Y-branch waveguide in which the occurrence of a rounded portion is suppressed by previously ensuring or allowing for it at the time of designing the branch width H. With this Y-branch waveguide, since a rounded portion does not arise, it is possible to achieve the designed for characteristics.

For these reasons, currently Y-branch waveguides with a U-shape between two branching waveguides, as shown by the solid line in FIG. 7, are frequently used.

However, with this type of Y-branch waveguide, even if the designed for characteristics are obtained, there is considerable non-conformance in guided wave mode field distribution between the transition guide wave and the branching waveguides.

FIG. 8 is a drawing for describing a Y-branch waveguide having a specified branch width disclosed in reference II. FIG. 8 schematically shows phase fronts of propagated light in the case where light is injected from a merging side waveguide.

As shown in FIG. 8, with this Y-branched waveguide 201 an advancing direction k1 of the propagating light in the junction area waveguide 207 (a normal direction of the phase front) and an advancing direction k2 (an ideal advancing direction) of propagating light in the branching waveguides 205a and 205b are different. At this time, overlapping of field distributions for guided wave mode propagated light close to a boundary of the junction area waveguide 207 and the branching waveguides 205a and 205b becomes slight. As a result, propagated light not injected to the branching wave guides 205a and 205b becomes emission mode and is discharged to a substrate side, which means that light loss in the Y-branch waveguide is increased.

Accordingly, in the Y-branch waveguide having a branch width between branching wave guides it is preferable to have a Y-branch waveguide that can reduce loss due to mode field distribution non-conformance between the junction area waveguide and the branching waveguides.

SUMMARY OF THE INVENTION

The Y-branch waveguide of the present invention comprises a single merging side waveguide, two branching waveguides, and a junction area waveguide provided between the merging side waveguide and the branching waveguides and formed in a tapered shape being thicker at the branching than at the merging side, in which there are provided two straight waveguides parallel to each other, each being connected to the junction area waveguide and to a different single branching waveguide. These straight waveguides extend in the same direction as the direction of propagation of light inside the junction area waveguide, when light is injected from the merging side waveguide.

With this structure, since the junction area waveguide and the branching waveguides are connected through the straight waveguides, it is possible to obtain the following type of effects.

Specifically, first of all light injected externally, for example, from the merging side waveguide, becomes propagated light having a specific propagation mode. If this propagated light is injected into the junction area waveguide that is tapered widening in the advancing direction, it is propagated without causing variation in the advancing direction.

After that, propagated light is branched and injected into each of the straight waveguides. With this structure, the extending direction of the straight waveguides is aligned with the advancing direction of propagated light in the junction area waveguide, which means that loss between the junction area waveguide and the straight waveguides is extremely low.

In this way, light distributed in each straight waveguide propagates through the straight waveguide. At that time, since one waveguide system is constructed of the whole of the two straight waveguides, a phase accelerator effect arise in part of the straight waveguides. At this time, therefore, the distributed propagated light propagates through the straight waveguide while changing direction (a detailed description of the reason for this will be given later).

As described above, the direction of propagating light in the straight waveguides can be aligned with the direction of propagating light in the vicinity of the boundary of the straight waveguides and the branch waveguides. As a result, non-conformance of mode field distribution is mitigated at the boundary sections. Accordingly, with the Y-branch waveguide of this invention loss caused by mode field distribution non-conformance can be reduced.

BRIEF DESCRIPTION OF THE DRAWINGS

FIG. 6 is a graph showing simulation results.

DESCRIPTION OF THE PREFERRED EMBODIMENT

An embodiment of a Y-branch waveguide of the present invention will now be described with reference to the attached drawings. In each of the drawings used in the description, the form, size and positional relationship of each structural component is shown schematically, and not in too much detail, simply to enable understanding of the invention. Also, the same reference numbers are used throughout the drawings for the same structural elements, and any repetition description thereof is omitted. In the embodiment, numerical values or any other set conditions are simply examples within the scope of the claims of the invention, and the present invention is not limited to them.

Figure 1:
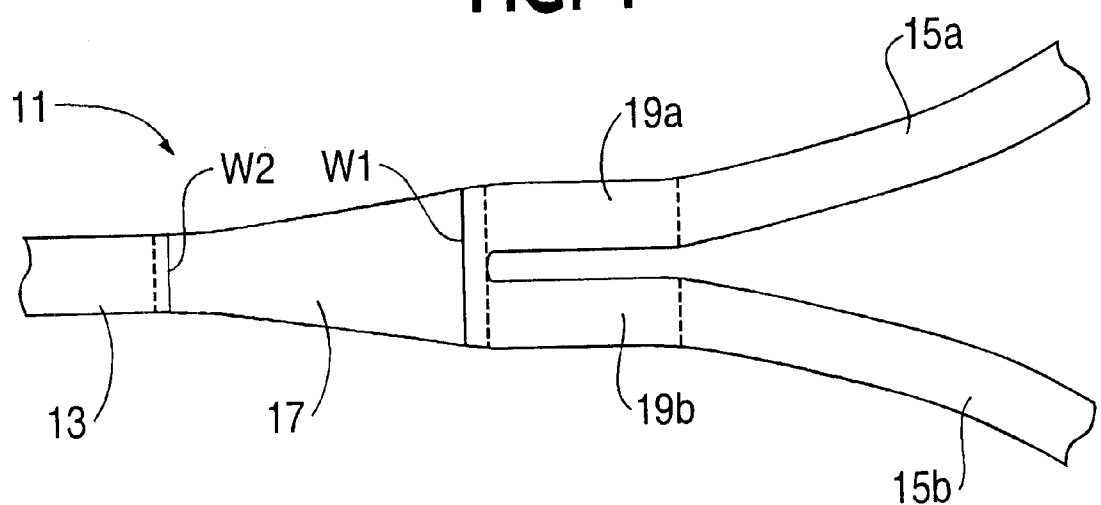
FIG. 1 is a plan view of an embodiment of a Y-branch waveguide of the present invention.

FIG. 1 schematically shows a Y-branch waveguide of an embodiment. In the following, the Y-branch waveguide of the embodiment will be described with reference to FIG. 1.

As shown in FIG. 1, this Y-branch waveguide 11 is similar to a conventional structure in that it comprises a single merging side waveguide 13, two branching waveguides (namely a first branching waveguide 15a and a second branching waveguide 15b) and a tapered junction area waveguide 17.

This Y-branch waveguide 11 is characterized by the fact that it also comprises a first straight waveguide 19a connecting the junction area waveguide 17 and the first branching waveguide 15a, and a second straight waveguide 19b connecting the junction area waveguide 17 and the second branching waveguide 15b. The first straight waveguide 19a and the second straight waveguide 19b are provided parallel to each other, and close together.

The junction area waveguide 17 is provided between the merging side waveguide 13 and the 15a and the second branching waveguide 15b, and is formed having a tapered shape with a width W1 at the branching (namely the side close to the branching waveguide 15a and the branching waveguide 15b) being wider than a width W2 at the merging side (namely the side close to the merging side waveguide 13).

When light is injected from the merging side waveguide 13, this light is injected to the junction area waveguide 17 from the merging side waveguide 13 and propagates to the inside of the junction area waveguide. The first straight waveguide 19a and the second straight waveguide 19b extend in the same direction as the direction of propagating light that propagates inside the junction area waveguide 17.

Also, the first straight waveguide 19a and the second straight waveguide 19b are connected to an end section of the junction area waveguide 17, and are provided with such a width that a rounded portion due to the limits of ultrafine machining similar to the related art does not occur, separated from each other at such a distance that it is possible to suppress the occurrence of a rounded portion at the time of ultrafine machining.

As shown in FIG. 1, preferably the first straight waveguide 19a and the second straight waveguide 19b have a uniform width throughout the respective extending directions (here the direction of propagated light). As a result, it is made difficult for undesired guided wave mode to be excited.

The length of the first straight waveguide 19a and the second straight waveguide 19b is of such a length that the direction of propagating light at or close to the respective boundaries of the first straight waveguide 19a and the second straight waveguide 19b and the first branching waveguide 15a and the second branching waveguide 15b is aligned with the direction of each of the branching waveguides 15a and 15b (namely a straight line direction of the branching waveguides 15a and 15b at or close to the boundary). This straight line direction means a direction extended in a straight line with respect to a center line of each of the branching waveguides 15a and 15b.

In the case where the lengths of the first straight waveguide 19a and the second straight waveguide 19b are longer than this, the advancing directions of the phase front is rotated too much. On the other hand, if the length is shorter than this, the advancing direction of the phase front is not rotated enough. This point will be described in detail later.

The first branching waveguide 15a and the second branching waveguide 15b are formed from respective curved waveguides. These first branching waveguide 15a and second branching waveguide 15b curve along the light propagation direction and away from each other.

It is assumed here that the sides where the first and second waveguides 15a and 15b are connected to the first and second straight waveguides 19a and 19b are starting points. As in the related art, the first and second waveguides 15a and 15b are respectively curved outward from the starting points with a varying center of curvature in such a manner that they are separate from each other. Initially, the center of curvature is close to a space defined by the first and second waveguides 15a and 5b, and then gradually becomes further away.

Each of the above described waveguides making up the Y-branch waveguide 11 is comprised of a stripe-shaped high refractive index region (core), and the periphery is surrounded by a low refractive index region (cladding) not shown in the drawings. As a result of this, light injected to each of the waveguides propagates through each waveguide as propagation light having a guided wave mode corresponding to a refractive index distribution of the respective waveguide.

This Y-branch waveguide 11 functions as a light branching element for branching light injected to the merging side waveguide 13 and respectively outputting it from the first branching waveguide 15a and the second branching waveguide 15b, and conversely also functions as a light merging element for merging light injected to the first branching waveguide 15a and the second branching waveguide 15b and outputting it from the merging side waveguide 13.

The Y-branch waveguide 11 of the example shown in the drawing is constructed to allow light power to be equally distributed as a light branching element, which means that it has a symmetrical structure about an axis aligned with the direction of propagated light of the merging side waveguide 13. However, it is possible to utilize various methods similar to those in the related art to allow the ratio at which light power is distributed to be different. For example, it is possible to adjust a taper opening angle of the junction area waveguide.

Figure 2:
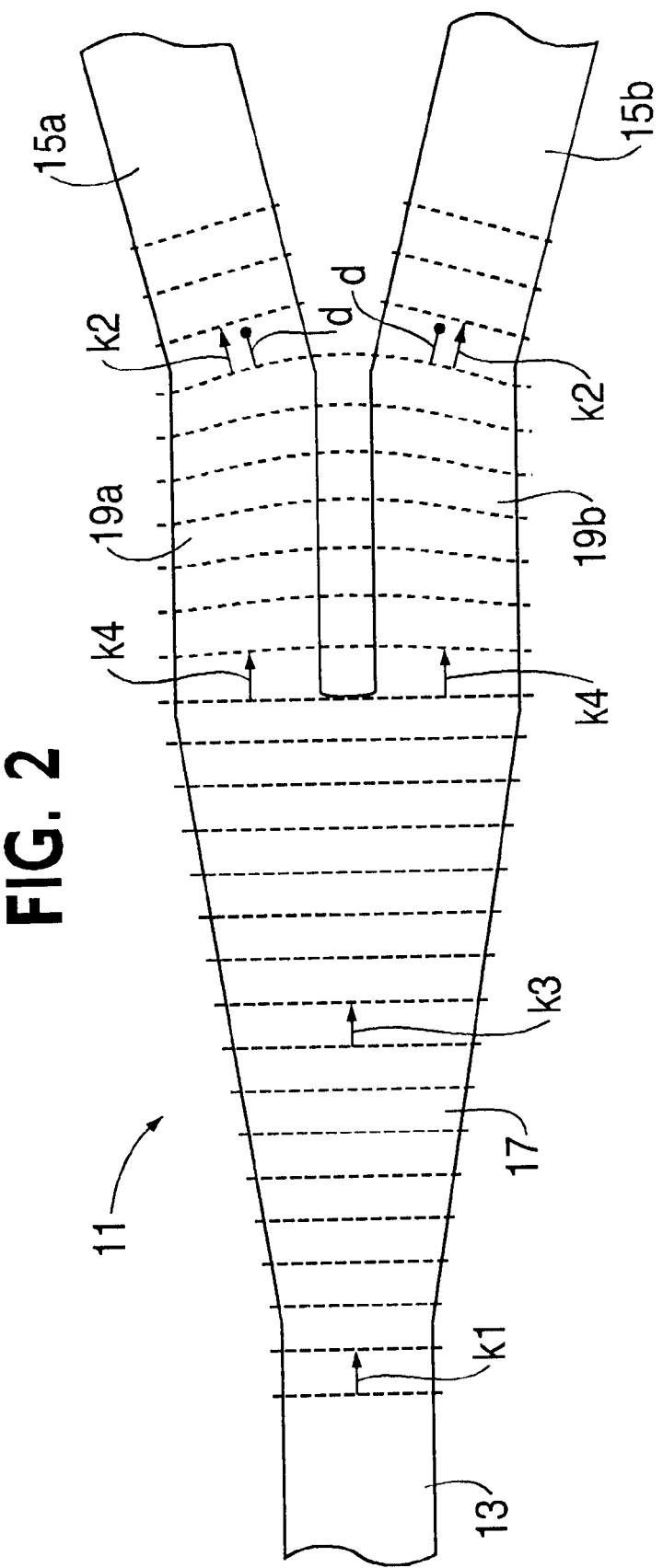
FIG. 2 is a drawing for describing the embodiment of the present invention.

FIG. 2 is a drawing for describing the Y-branch waveguide of the embodiment. The dotted lines in FIG. 2 schematically show phase fronts of propagated light in the case where light is injected from the merging side waveguide. In the following a description will be given, in chronological order, of the behavior of propagated light in the Y-branch waveguide of FIG. 1.

As shown in FIG. 2, first of all propagating light of the merging side waveguide 13 of the Y-branch waveguide 11 is injected into the junction area waveguide 17. At this time, a direction k3 of the propagating light of the junction area waveguide 17 and a direct k1 of propagating light of the merging side waveguide 13 (a direction perpendicular to the phase front) are aligned.

Next, propagating light that has passed through the junction area waveguide 17 is branched without changing the direction k3, and injected into the first straight waveguide 19a and the second straight waveguide 19b.

At this time, since the direction in which the first straight waveguide 19a and the second straight waveguide 19b extend is aligned with the direction k3 of propagating light of the junction area waveguide 17, a direction k4 of propagating light of the first straight waveguide 19a and the second straight waveguide 19b is aligned with the direction k3 of the propagating light of the junction area waveguide 17. Accordingly, light loss close to the boundaries of the junction area waveguide 17 and the first straight waveguide 19a and the second straight waveguide 19b is small. When the propagating light directions k3 and k4 are in alignment, the merging side waveguide 13 and the first straight waveguide 19a and the second straight waveguide 19b are parallel to each other.

Also, since the first straight waveguide 19a and the second straight waveguide 19b are parallel to each other and arranged close together, they can be regarded as a single waveguide system. Accordingly, the two propagating lights propagating in the first straight waveguide 19a and the second straight waveguide 19b (respectively called a first propagating light and a second. propagating light) behave as a single propagating light. The first straight waveguide 19a and the second straight waveguide 19b of the illustrated example are provided apart from each other at a distance at which they influence one another as if the first propagation light and the second propagation light were a single propagation light.

Specifically, as shown in FIG. 2, propagation light injected into the first straight waveguide 19a and the second straight waveguide 19b, propagate through high refractive index sections of the first straight waveguide 19a and the second straight waveguide 19b (namely the cores), and low refractive index section (namely cladding) enclosed between the first straight waveguide 19a and the second straight waveguide 19b. As a result, the velocity of a phase front propagating through this low refractive index section (phase velocity) is faster than through the high refractive index sections.

Accordingly, as shown in FIG. 2, a phase front of propagating light propagating through the first straight waveguide 19a and the second straight waveguide 19b becomes a substantially convex arc shape with respect to the advancing direction, and moreover the radius of curvature of the arc varies with propagation so as to become gradually smaller (known as the phase accelerator effect).

As has been described above, if the length of the first straight waveguide 19a and the 19b is appropriately set, a direction k2 of propagating light close to the boundary of the first straight waveguide 19a and the second straight waveguide 19b and the first branching waveguide 15a and the second branching waveguide 15b can be aligned with a tangential direction at or close to the boundaries of the 15a and the second branching waveguide 15b.

Therefore, mode field distribution non-conformance close to each of the straight waveguides 19a and 19b and each of the branching waveguides 15a, and 15b is moderated, and it is possible to reduce loss caused by this mode distribution non-conformance.

Also, with this Y-branch waveguide 11, the first straight waveguide 19a and the second straight waveguide 19b are parallel to each other, and the respective widths of the first straight waveguide 19a and the second straight waveguide 19b are uniform along the direction in which they extend, which means that the phase accelerator effect is not cancelled but it is possible to maintain a constant phase accelerator effect. Accordingly, it is normally possible to obtain a wavefront rotation action at sections of the straight waveguides. Also, when a constant phase accelerator effect is obtained in this way, it becomes possible to easily design a Y-branch waveguide having a lot of general operating parameters.

After that, propagation light respectively injected from the first straight waveguide 19a and the second straight waveguide 19b into the first branching waveguide 15a and the second branching waveguide 15b is taken out to external section similarly to the related art.

FIG. 3 and FIG. 4 are cross sectional drawings showing sections of parts each of the straight waveguides for principal steps in one example of a manufacturing process for the Y-branch waveguide of the embodiment.

Figure 3A:
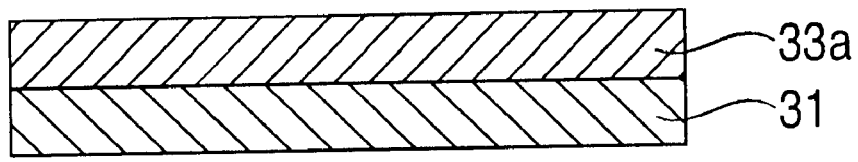
FIG. 3 is cross sectional drawings of sections of a straight waveguide, showing a manufacturing process of the present invention.

First of all, as shown in FIG. 3(A), a lower cladding layer 33 is formed on a silicon substrate using a plasma CVD method. at this time, tetraethoxysilane ($Si(OC_2H_5)_4$), which is one type of organic oxysilane, is used as a deposition gas, for example.

Figure 3B:
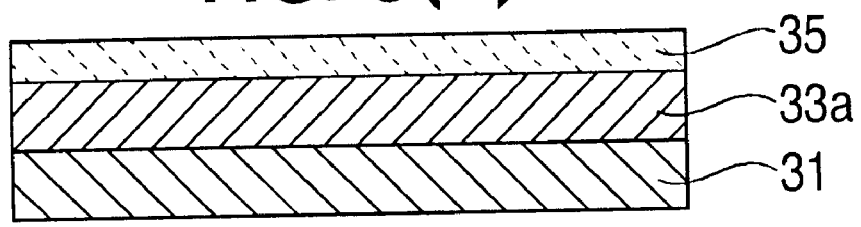

Next, as shown in FIG. 3(B), a core film 35 is formed on the lower cladding layer 33 using a similar plasma CVD method. At this time, a specified amount of fluorine, phosphorous, germanium, boron etc. are added, and by using tetraethoxysilane as a deposition gas the refractive index of the core film 35 is made slightly higher than the refractive index of the lower cladding layer.

Figure 3C:
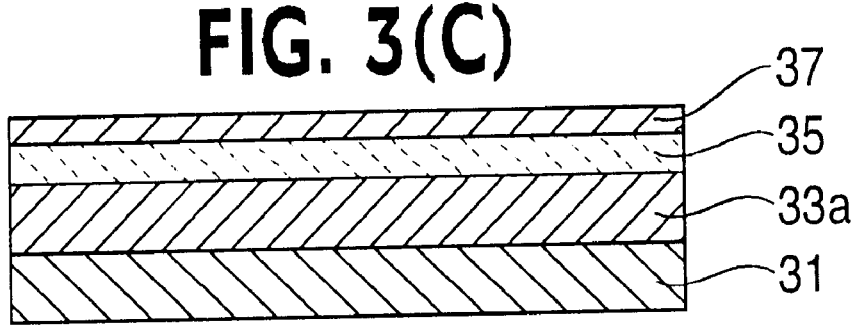
Figure 3D:
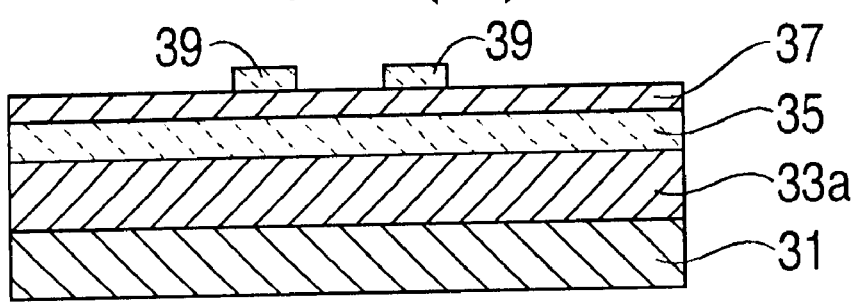

Following on, as shown in FIG. 3(C), etching mask material 37 is thin film formed so as to cover the core film 35. Then, as shown in FIG. 3(D), a resist pattern 39 is formed so as to cover only the core formation pattern on the etching mask material 37.

Figure 4A:
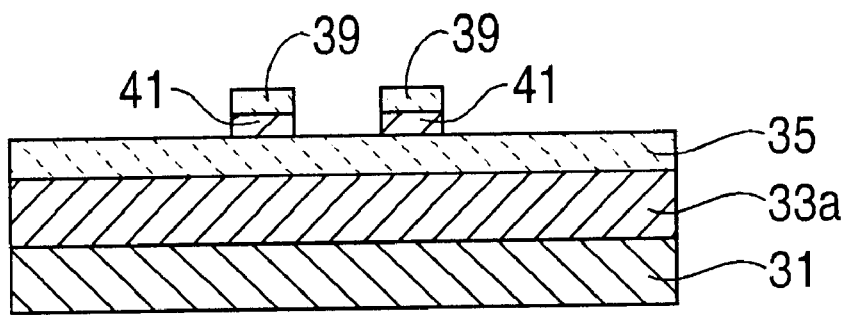
FIG. 4 is cross sectional drawings of sections of a straight waveguide, showing a manufacturing process of the present invention.
Figure 4B:
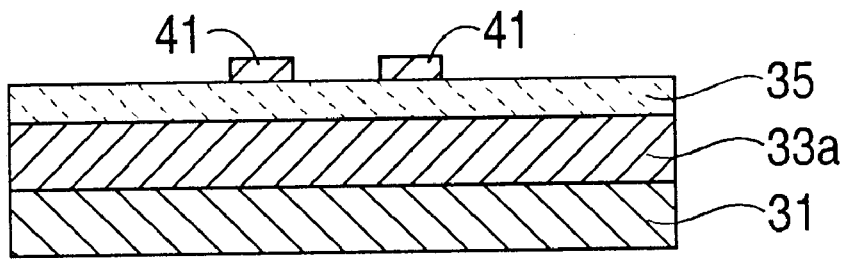

Next, as shown in FIG. 4(A), by dry etching the etching mask material through the resist pattern 39 an etching mask 42 covering the core formation pattern is formed, followed by removal of the resist pattern 39 as shown in FIG. 4(B).

Figure 4C:
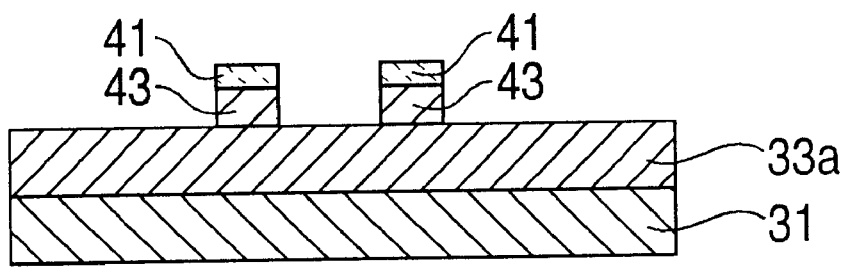

As shown in FIG. 4(C), by the dry etching the core film 35 through the etching mask 41 a core 43 constituting a waveguide pattern having a Y-branch structure is then formed.

Figure 4D:
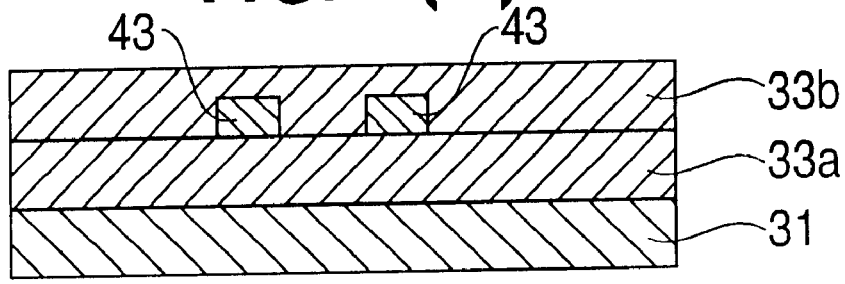

Next, as shown in FIG. 4(D), the etching mask 41 is removed and an upper cladding layer 33b is formed using a plasma CVD method so as to cover the core 43 and the lower cladding layer 33a. At this time, the same gas as used when forming the lower cladding layer 33a is used as a deposition gas.

For example, it is possible to form an embedded type Y-branch waveguide with the above described process. It goes without saying that the Y-branch waveguide of this invention is not limited the embedded type in the illustrated example, and it is also possible to be a ridge type or to have any other suitable waveguide structure. Also, the refractive index distribution shape of the core 43 can be either a step index type or a gradient index type.

Now, simulation results for the Y-branch waveguide of the embodiment will be described. The Y-branch waveguide in this simulation is an embedded type Y-branch waveguide formed with the above described process. The width and height of the core (namely the merging side waveguide, each of the straight waveguides and each of the branching waveguides) are se to 5 $\mu$m, the thickness of the lower cladding layer and the upper cladding layer is set to 20 $\mu$m, the refractive index of the core is set to 1.4556, and the refractive index of the clad is set to 1.4505 (measurement wavelength 1.31 $\mu$m), and a single mode Y-branch waveguide is constructed.

Figure 5:
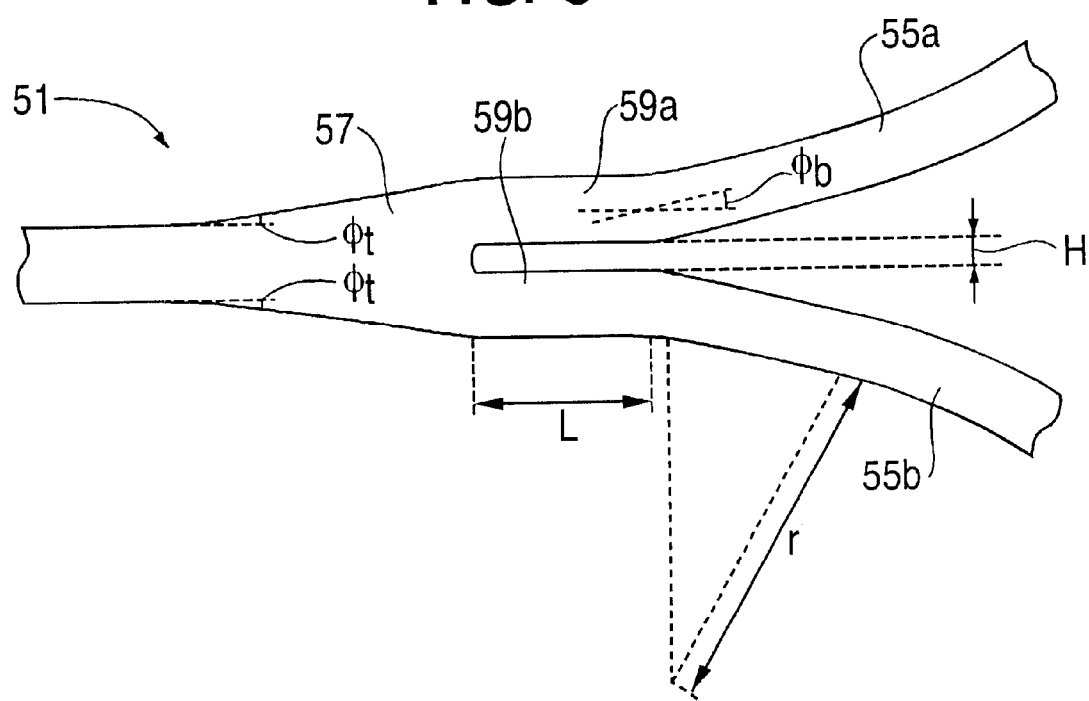
FIG. 5 a plan view of a Y-branch waveguide used in a simulation.
Figure 7A:
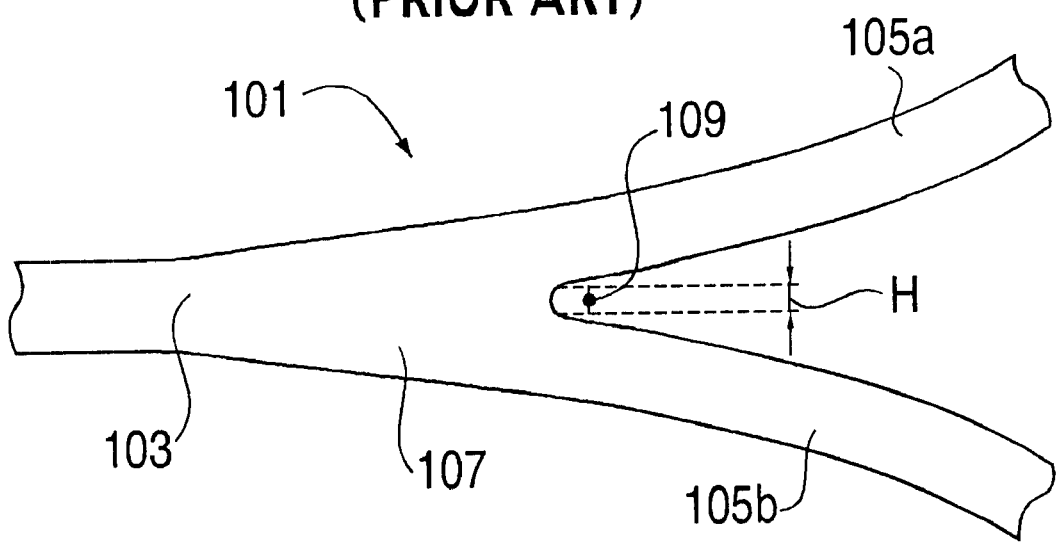
FIG. 7 is a plan view of a conventional Y-branch waveguide.
Figure 7B:
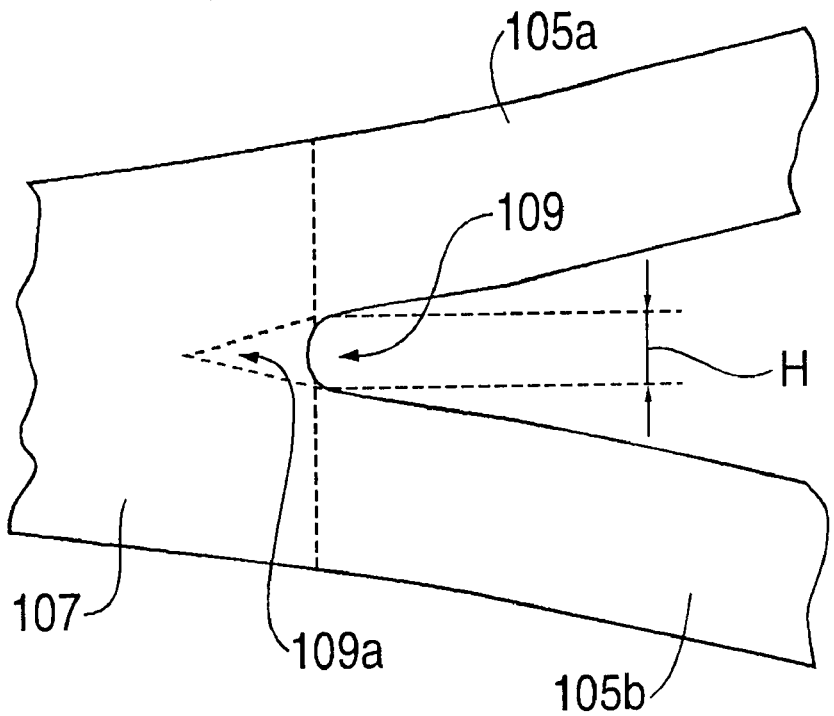
Figure 8:
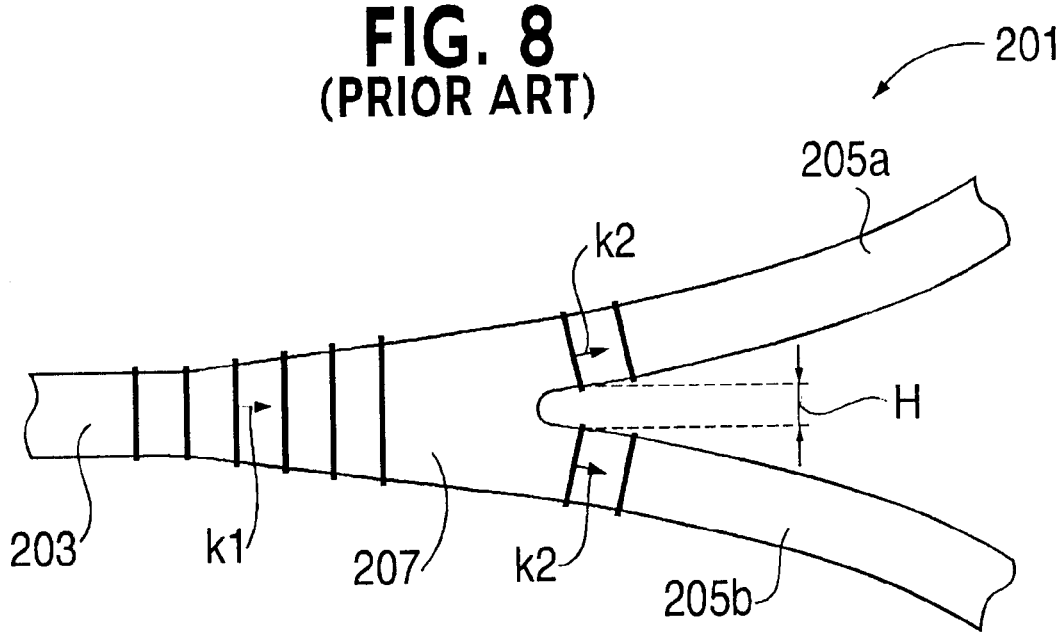
FIG. 8 is a plan view of a conventional Y-branch waveguide having a specified branch width.

FIG. 5 is a drawing showing the Y-branch waveguide submitted for simulation. As shown in FIG. 5, with this Y-branch waveguide 51, an opening angle $\phi$ t of the junction area waveguide 57 is set to 0.5°, an interval w of the first straight waveguide 59a and the second straight waveguide 59b is set to 3.5 $\mu$m, and a radius of curvature r of the first branching waveguide 55a and the second branching waveguide 55b is set to 25 mm. The wavelength of the incident light is 1.31 $\mu$m. At this time, a branching angle $\phi$ b formed by the first straight waveguide 59a and the first branching waveguide 55a (in this case the angle formed by the second straight waveguide 59b and the second branching waveguide 55b is the same) is set to a different value, and a relationship between the length of each of the first branching waveguide 55a and second branching waveguide 55b and excess loss is examined.

FIG. 6 is a graph showing simulation results. The horizontal axis represents the length of each straight waveguide ($\mu$m), while the vertical axis represents excess loss (dB). Also, each curved line shows a relationship between length L of the straight waveguide and excess loss when the branching angle is 0.00°, 0.2°, 0.5°, 1.0°, 1.5° and 2.00°.

As can also be understood from FIG. 6, for each curved line (except for the case of 0.0°) there a length L of the straight waveguide giving a minimum excess loss value. The length L giving this minimum excess loss value has a tendency to become longer as the branch angle $\phi$ b increases. This indicates that with the advancing of propagating light of the straight waveguides the radius of curvature of arcs making up the phase front of this propagated light becomes smaller.

With the curved lines shown in FIG. 6, a minimum value appears periodically in a region, not shown in the drawing, where the waveguide is longer than 100 $\mu$m, but such a minimum value inevitably becomes larger than a minimum value of a region where the waveguide is shorter than the 100 $\mu$m of the illustrated example, which means that a plurality of regions where the waveguide is longer than 100 $\mu$m are omitted.

As shown in FIG. 6, with this Y-branch waveguide, with a branch angle $\phi$ b of 1.0° and a straight waveguide length of 60 $\mu$m, a minimum value of excess loss of 0.28 dB is obtained.

Also, a straight waveguide length L that can reduce the excess loss is in a range 20 $\mu$m $\leq$ L $\leq$ 60 $\mu$m with a branch angle $\phi$ b of $\phi$ b to 0.2°, and with the branch angle $\phi$ b in a range of 0.2° $\leq \phi$ b $\leq$ 1.0° the length L is in a range 20 $\mu$m $\leq$ L $\leq$ 100 $\mu$m, while with the branch angle $\phi$ b in a range of 1.0° $< \phi$ b $\leq$ 1.5° the length L is in a range 40 $\mu$m $<$ L $\leq$ 90 $\mu$m.

Specifically, in the generally used wavelength bands of 1.3 $\mu$m and 1.5 $\mu$m, to allow a reduction in excess loss of the Y-branch waveguide the length L of the straight waveguides is preferably about 100 $\mu$m or less.

A plurality of the Y-branch waveguide of the embodiment described above can be used to construct a 1×N splitter. It is also possible to construct a 1×N branch type switch array or an N×N matrix switch using this Y-branch waveguide.

As has been clearly described above, according to this Y-branch waveguide a plurality of straight and parallel waveguides including the junction area waveguides and branch waveguides are juxtaposed are juxtaposed in a specified direction. Accordingly, a phase accelerator effect can be caused in the straight waveguides, which means that by adjusting the length of the straight waveguides the direction of propagating light in the straight waveguides can be aligned with the direction of light close to a boundary of the straight waveguides and the branching waveguides. As a result, mode field distribution nonconformance is reduced at these boundary sections. Thus, with this invention loss attributable to mode field distribution non-conformance of a Y-branch waveguide having branch width at branching waveguides can be reduced.

What is claimed is:

1. A Y-branch waveguide comprising:

a merging side waveguide;

a first branching waveguide and a second branching waveguide;

a junction area waveguide provided between said merging side waveguide and said first and second branching waveguides, wherein said junction area waveguide has a tapered shape being thicker at a side closer to said first and second branching waveguides than at a side closer to said merging side waveguide; and a first straight waveguide and a second straight waveguide parallel to each other, said first and second straight waveguides being connected to said junction area waveguide and respectively to one of said first and second branching waveguides, wherein said first and second straight waveguides extend in a same direction as a direction of propagation of light inside said junction area waveguide, when light is injected from said merging side waveguide to said junction area waveguide, wherein a length of said first and second straight waveguides is such that when propagating light injected into said first and second straight waveguides propagates through said first and second straight waveguides and reaches a boundary or the vicinity of a boundary between said first and second straight waveguides and said first and second branching waveguides, respectively, a tangential direction of the propagating light at or in the vicinity of the boundary is aligned with said first and second branching waveguides at or close to the boundary.

* * * * *